United States Patent
Kim

(10) Patent No.: US 7,489,674 B2
(45) Date of Patent: Feb. 10, 2009

(54) METHOD FOR WIRELESS LOCAL AREA NETWORK COMMUNICATION USING MULTIPLE CHANNELS

(75) Inventor: Jun-whan Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 614 days.

(21) Appl. No.: 10/846,666

(22) Filed: May 17, 2004

(65) Prior Publication Data

US 2004/0240422 A1   Dec. 2, 2004

(30) Foreign Application Priority Data

May 30, 2003  (KR) ................. 10-2003-0034808

(51) Int. Cl.
*H04B 7/212* (2006.01)
(52) U.S. Cl. .............. 370/348; 370/351; 370/352; 370/353; 370/354; 370/355; 370/356; 370/494; 370/495; 455/418; 455/419; 455/423; 455/466; 455/450; 455/451; 455/452.1; 455/452.2; 455/453; 455/455; 709/238; 709/239; 709/240; 709/241; 709/242; 709/243; 709/244
(58) Field of Classification Search ......... 370/230–235, 370/322, 329, 338, 341, 348, 442–445, 351, 370/352, 353, 354, 355, 356, 494, 495; 455/450–453, 455/418, 419, 423, 466, 455; 709/238–244
See application file for complete search history.

(56) References Cited

U.S. PATENT DOCUMENTS

| | | | | |
|---|---|---|---|---|
| 6,173,411 | B1 * | 1/2001 | Hirst et al. | 714/4 |
| 6,839,331 | B2 * | 1/2005 | Rudnick | 370/312 |
| 7,031,717 | B2 * | 4/2006 | Mazzara | 455/450 |
| 2003/0067892 | A1 | 4/2003 | Beyer et al. | |

FOREIGN PATENT DOCUMENTS

| | | | |
|---|---|---|---|
| GB | 2 375 015 A | | 10/2002 |
| GB | 2375015 | * | 10/2002 |
| KR | 10-0240634 B1 | | 10/1999 |
| KR | 2001-090864 A | | 10/2001 |
| KR | 2002-037685 A | | 5/2002 |
| WO | WO 99/43130 A1 | | 8/1999 |
| WO | WO 00/70814 A1 | | 11/2000 |

* cited by examiner

*Primary Examiner*—Stephen M D'Agosta
(74) *Attorney, Agent, or Firm*—Sughrue Mion, PLLC

(57) ABSTRACT

A method for wireless LAN communication using multiple channels is provided. An ATIM containing channel information is generated when there is data to be sent, and the ATIM is transmitted via a main channel after a predetermined period of time. When a station loses a channel reservation competition, the station generates and transmits via the main channel another ATIM containing channel information regarding another channel to be used from data transmission. The station then performs channel switching to the other channel corresponding to the channel information, transmits the data via the other channel, and switches the channel back to the main channel at the time of a subsequent beacon.

13 Claims, 8 Drawing Sheets

Assumption: Three channels are available. A channel includes two stations. There are a total of five stations. Packet size is 1,500 bytes.

METHOD FOR WIRELESS LOCAL AREA NETWORK COMMUNICATION USING MULTIPLE CHANNELS

BACKGROUND OF THE INVENTION

This application is based on and claims priority from Korean Patent Application No. 10-2003-0034808 filed on May 30, 2003, in the Korean Intellectual Property Office, the disclosure of which is incorporated herein in its entirety by reference.

1. Field of Invention

The present invention relates to a method for wireless local area network (LAN) communication in an ad hoc network, and more particularly, to a method for wireless LAN communication by which a station that has lost a channel reservation competition for a main channel can transmit data via another channel.

2. Description of the Related Art

In general, a wireless LAN refers to a wireless LAN based on IEEE 802.11 standards. IEEE 802.11 defines standards for a wireless LAN operating in the 2.4~2.5 GHz ISM (Industrial, Scientific, Medical) band. The ISM band is a frequency band prescribed for the utilization of equipment in industrial, scientific and medical applications. The ISM band can be freely used without permission if the transmitting power is less than a predetermined level.

An IEEE 802.11 network is basically configured with a Basic Service Set (BSS) composed of several stations communicating with one another. The BSS includes an independent BSS in which stations perform direct communication therebetween without using, an access point (AP), and an infrastructure BSS in which an AP is used in all communication processes.

The independent BSS mainly consists of several stations constructed with a specific purpose and for a specific period of time. For example, the independent BSS includes a network established upon holding a meeting in a conference room. When the meeting begins, respective attendants will establish an independent BSS to share their data. Then, when the meeting ends, the attendants will break up the independent BSS. Because of the short life, small scale and specific purpose of such an independent BSS, it is often called an ad hoc BSS or ad hoc network.

FIG. 1 shows a wireless LAN in an ad hoc environment, which is configured with five stations.

First and third stations intend to transmit their data to second and fourth stations, respectively. The first and third stations that intend to send data transmit the data competitively via a channel reservation competition. As a result of the competition, only the station that wins in the competition is allowed to transmit the data.

FIG. 2 shows a conventional data transmission process of a wireless LAN in the ad hoc network of FIG. 1.

In FIG. 2, a beacon is a frame responsible for the notification of a presence of a network and maintenance of the network. The beacon is periodically transmitted so that a mobile station causes parameters to correspond thereto for participation in the network and finds and recognizes the network. In an infrastructure network, an AP performs the beacon transmission. In an ad hoc network, each station performs the beacon transmission and only a beacon of a station that has won the competition is transmitted. If a station that has received a beacon has data to be sent (i.e., MAC Protocol Data Unit: MPDU), the station generates an announcement traffic indication message (ATIM), and transmits the generated ATIM to notify the presence of the buffered data.

Referring to FIG. 2, it shows a case where the first station has won a competition with the third station. In particular, FIG. 2 shows that the first and third stations have their data to be sent to the second and fourth stations, respectively, and intend to generate and transmit their ATIMs, but the first station has sent an ATIM first. The ATIM of the first station has been transmitted to the second to fifth stations, but the third station cannot transmit its ATIM to the fourth station. When an ATIM window, i.e. time period during which an ATIM can be transmitted, terminates, the third station that lost in competition and the fourth and fifth stations with no data to be sent enter a doze mode in order to save power. When it is time for the third to fifth stations in the doze mode send subsequent beacons, they return to an active mode in order to send or receive beacons in competition with the first and second stations. In active mode, the aforementioned process is repeated again.

The data transmission of the first and second stations is performed after the ATIM window terminates. To avoid a collision that may be caused by any hidden stations, the first station intending to send data transmits a request-to-send (RTS) while the second station receiving the data transmits a clear-to-send (CTS) so as to reserve a transmission medium or to assure continuous data transmission. When the RTS and CTS are thus exchanged, the first station transmits the data and the second station acknowledges the received data. The data transmission may be performed on the basis of several fragments, and a station that has received each fragment sends an acknowledgement (ACK) in response thereto. A short interframe space (SIFS) is provided between associated frames such as RTSs and CTSs, data, and ACKs for reception of data.

FIG. 3 shows a conventional data transmission process of a wireless LAN in the ad hoc network of FIG. 1.

In FIG. 3, a case is shown where the third station has successfully sent an ATIM to the fourth station and the first station also has successfully sent an ATIM to the second station. In this case, the first to fourth stations are all in active mode. If the ATIM window terminates, the first and third stations competitively send their data. At this time, if the first station first transmits the RTS, the first station takes priority of transmission of data to the second station. Due to the presence of a network allocation vector (NAV) in the RTS packet, the third station cannot transmit data for a period of time during which the first station is sending and receiving the data. After the first station completes data transmission to the second station, the third station can transmit the data only if time to receive a beacon still remains. Meanwhile, although the RTS and CTS are packets used in overcoming problems with any hidden nodes, they may be omitted. FIG. 3 shows that upon transmission of data to the fourth station, the third station transmits data while omitting transmission of the RTS and CTS.

As described above, there is a need for a method and apparatus for allowing a station to transmit data even though the station loses a competition in an ad hoc network. That is, in the case of FIG. 2, the third station cannot transmit data to the fourth station. In the case of FIG. 3, the third station cannot transmit data during a predetermined period of time in the network allocation vector. Further, even though it is possible to implement a method and apparatus for allowing a station to transmit data even when the station loses a competition, there is a problem in that if the implementation method greatly deviates from existing IEEE 802.11 standards, a station meeting the standards cannot perform wireless communication with such a newly implemented apparatus. Therefore, there is a need for an improved method and apparatus for allowing a station to perform wireless communication with standard stations while meeting IEEE 802.11 standards.

SUMMARY OF THE INVENTION

In view of the aforementioned needs, a method for wireless LAN communication is provided which allows a station that has lost a competition to perform wireless communication via another channel by using multiple channels, and is compatible with an existing method for wireless LAN communication.

According to an exemplary embodiment of the present invention, a method for wireless LAN transmission using multiple channels comprises generating, by a second station intending to transmit data to a first station, a first ATIM containing information on a channel through which data will be transmitted, and transmitting the first ATIM via a main channel; if the second station loses in channel reservation competition through the transmission of the first ATIM, generating, by the second station, a second ATIM containing information on other channels except the channel for which the second station has lost in competition, and transmitting the second ATIM via the main channel; and performing, by the second station, channel switching to the other channel and transmitting data via the switched channel.

The determination whether channel reservation competition is won may be made based on whether the second station first receives an ACK for the ATIM of the second station from the first station. A frame structure of the ATIM generated by the second station may be a structure meeting IEEE 802.11 standards, and the channel information may be stored in a data field of the ATIM. Further, the method may further comprise, if the data transmission channel is not the main channel at the time of reception of a beacon found based on a space between beacons, switching the data transmission channel to the main channel by the second station. The generation and transmission of the ATIM by the second station may be enabled within an ATIM window. The second station may generate the ATIM and then transmit the generated ATIM after a predetermined period of time so as to reduce the possibility of collisions with ATIMs generated and transmitted by the other stations.

According to an exemplary embodiment of the present invention, a method for wireless LAN reception using multiple channels comprises receiving, by a first station, an ATIM containing information on a channel through which a second station will transmit data, via a main channel; sending, by the first station, an ACK for the ATIM to the second station via the main channel; switching, by the first station, a data reception channel to a channel corresponding to the channel information contained in the ATIM, and receiving the data from the second station via the switched channel; and sending, by the first station, an ACK for the received data to the second station via the transmission channel.

The first station may acquire the information on the transmission channel from a data field of the received ATIM. If the data reception channel is not the main channel at the time of reception of a beacon found based on a space between beacons, the first station may switch the data reception channel to the main channel. Further, the first station may transmit the ACK for the received ATIM to the second station only when the first station receives the ATIM within an ATIM window.

BRIEF DESCRIPTION OF THE DRAWINGS

The above and other objects and features of the present invention will become apparent from the following description of exemplary embodiments given in conjunction with the accompanying drawings, in which.

DETAILED DESCRIPTION OF THE INVENTION

Hereinafter, exemplary embodiments of the present invention will be described in detail with reference to the accompanying drawings.

Figure 1:
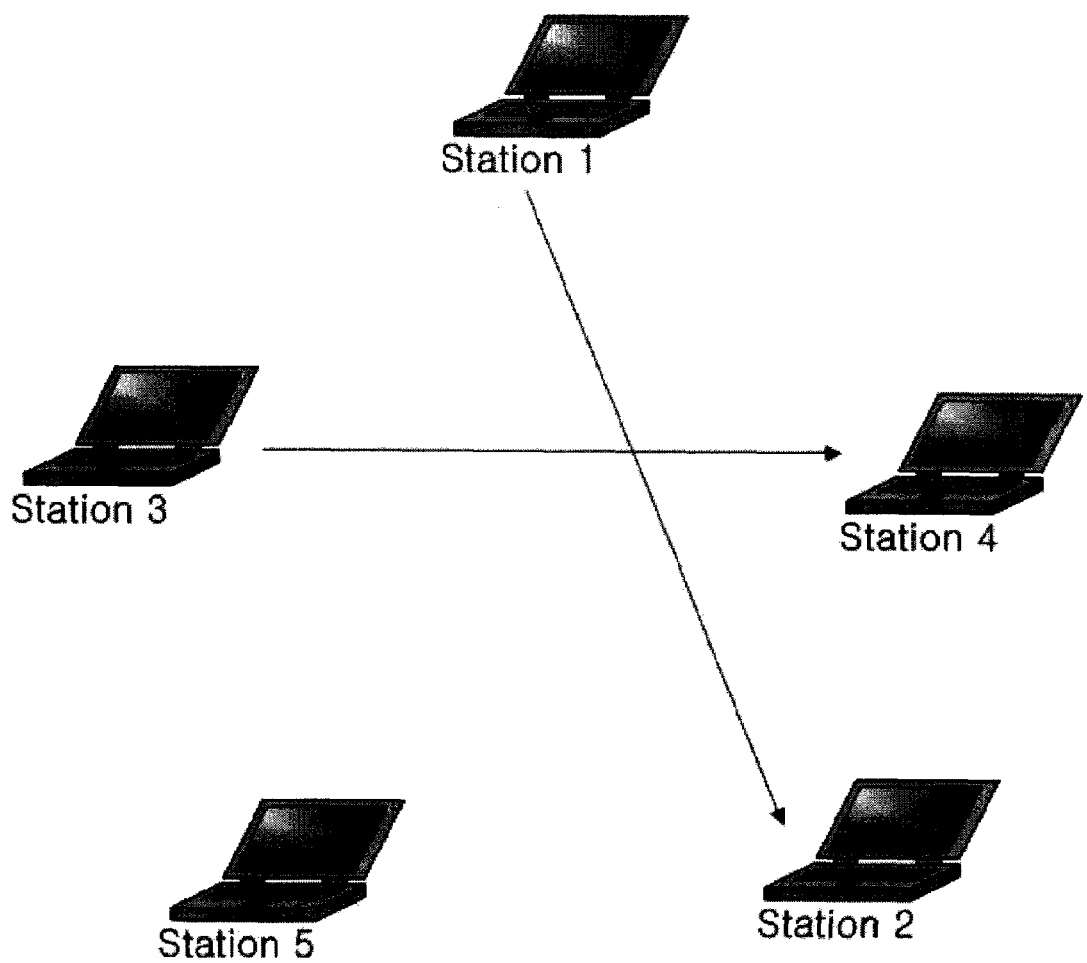
FIG. 1 shows a wireless LAN in an ad hoc environment configured with five stations.
Figure 2:
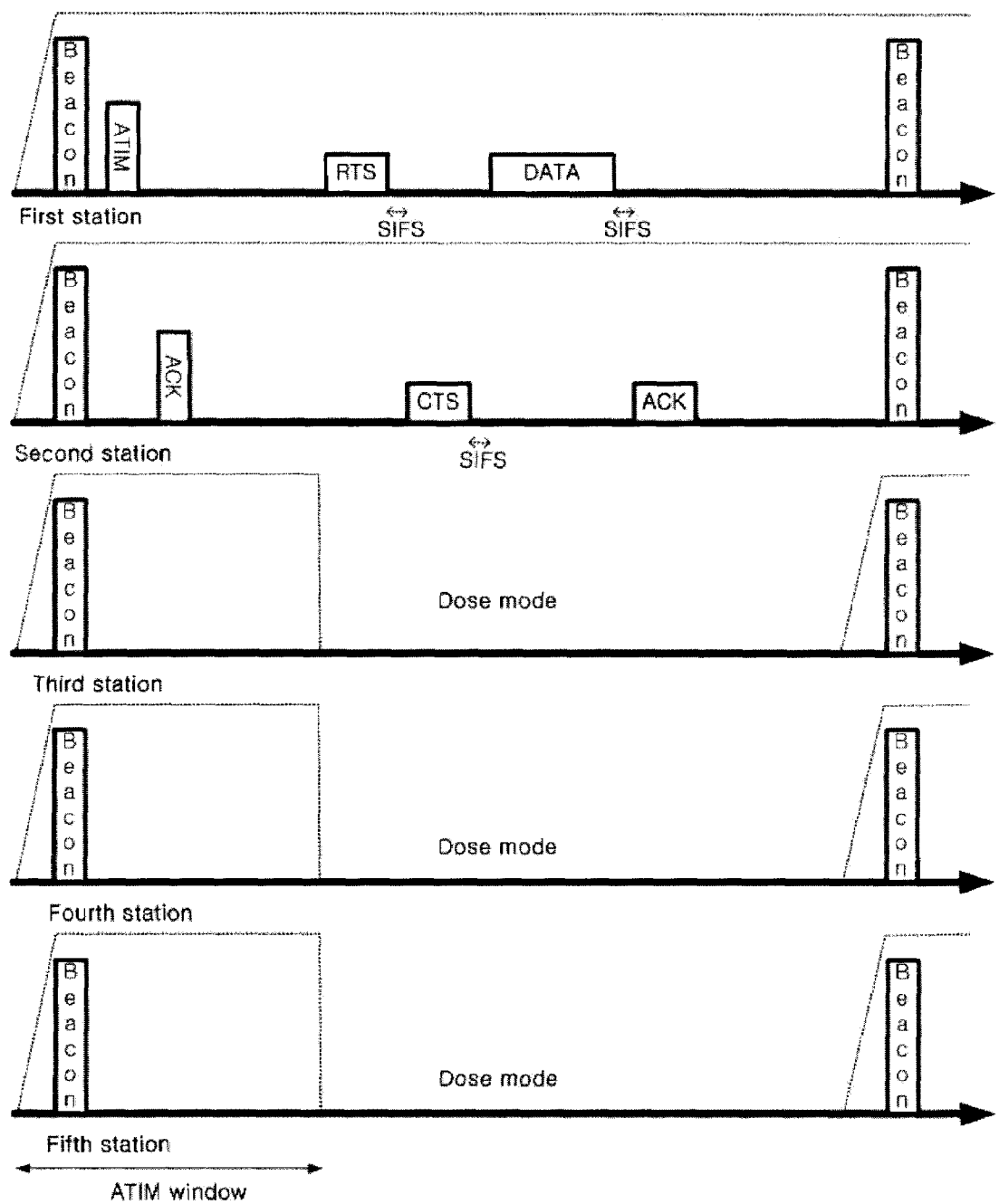
FIG. 2 shows a conventional data transmission process of a wireless LAN in an ad hoc network.
Figure 3:
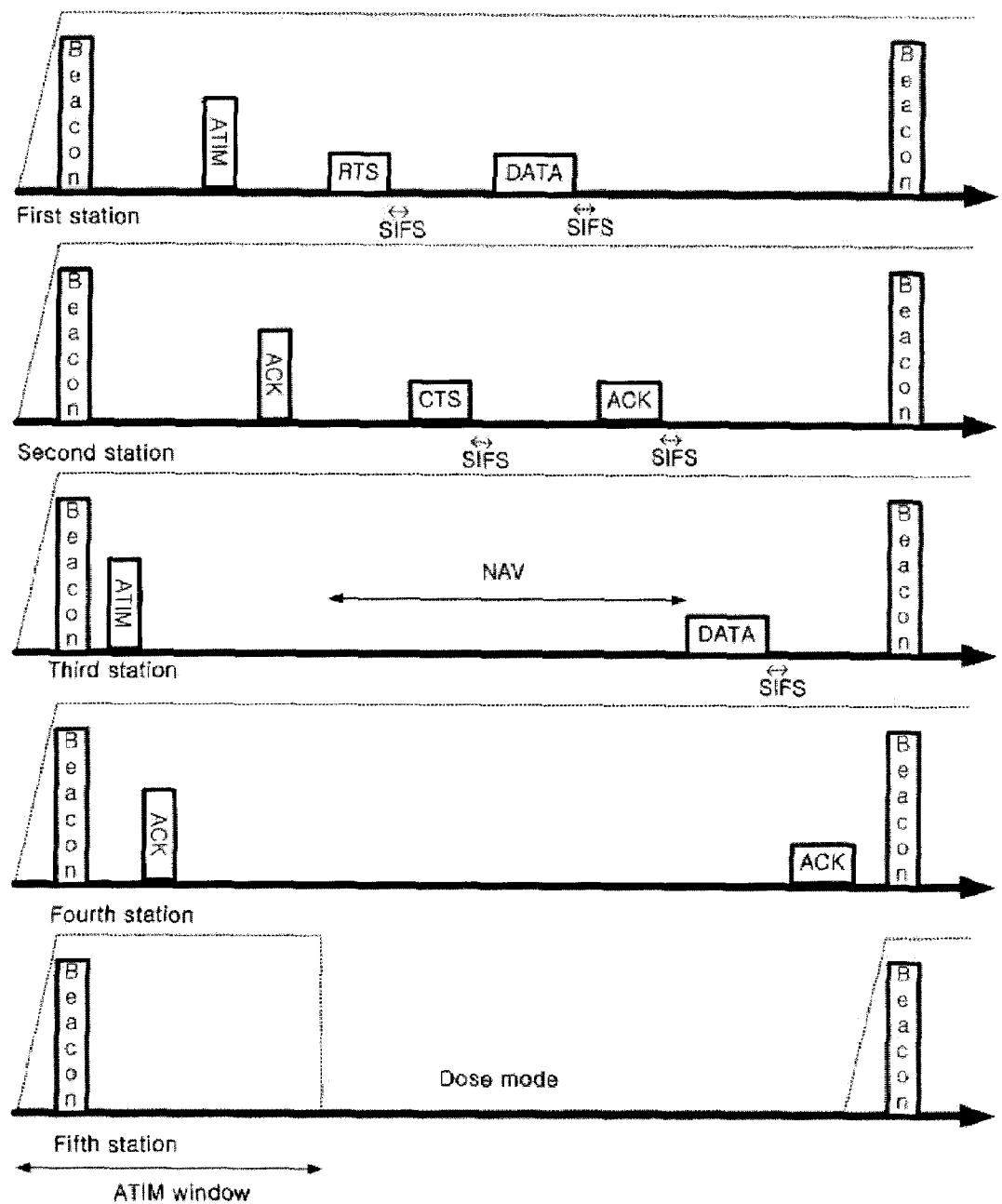
FIG. 3 shows a conventional data transmission process of a wireless LAN in an ad hoc network.
Figure 4A:
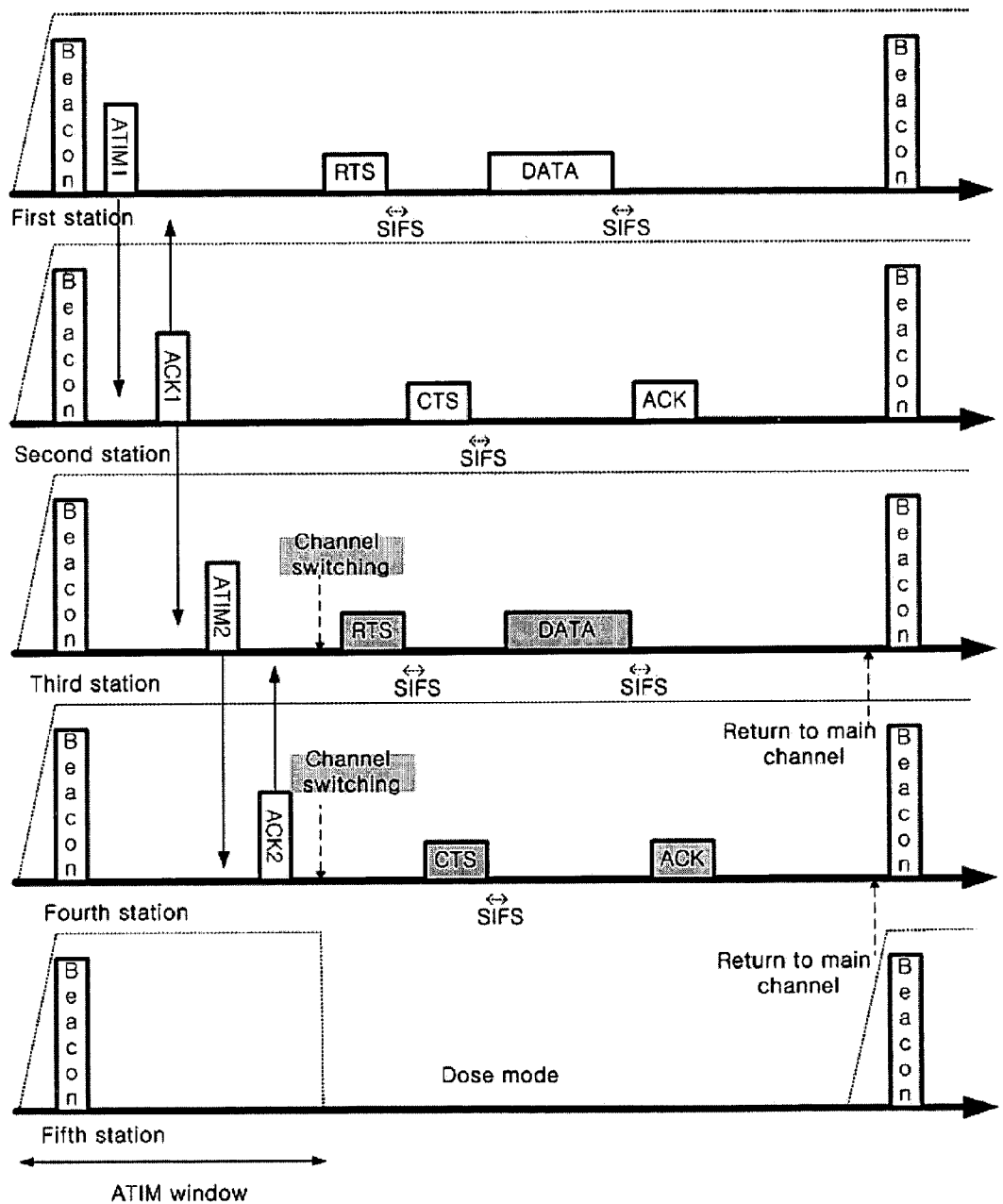
FIG. 4A shows a data transmission process of a wireless LAN in an ad hoc network according to an exemplary embodiment of the present invention.
Figure 4B:
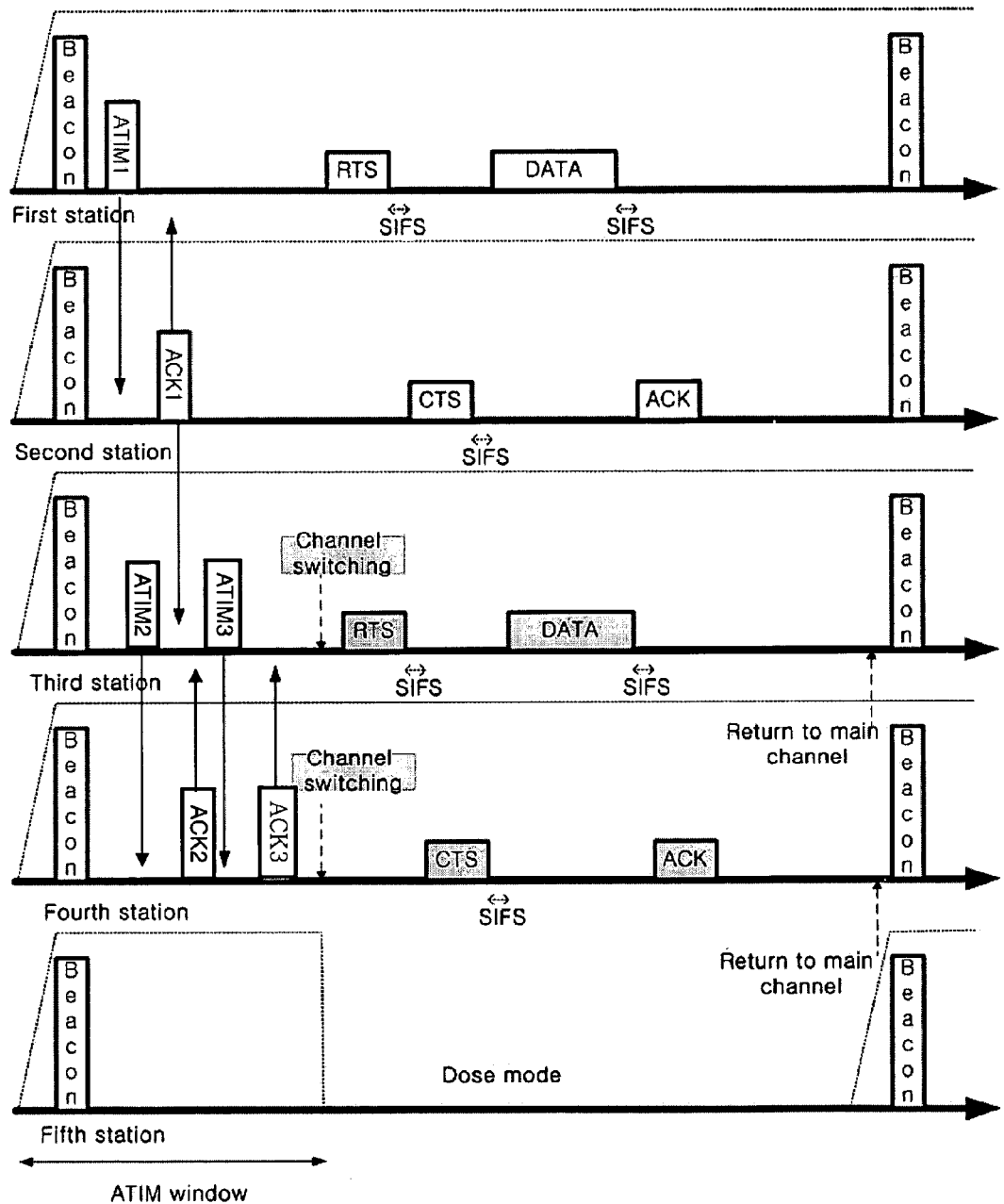
FIG. 4B shows a data transmission process of a wireless LAN in an ad hoc network according to an exemplary embodiment of the present invention.

FIGS. 4A and 4B schematically shows a data transmission process of a wireless LAN in an ad hoc network according to an exemplary embodiment of the present invention.

In this exemplary embodiment of the present invention, an ATIM window and a data transmission section are provided between beacons. A station that will send data is determined in the ATIM window. The present invention uses multiple channels to increase data throughput and the multiple channels are divided into a main channel for the transmission of beacons, ATIMs and data, and an extra channel for the transmission of data. Hereinafter, a channel refers to a channel of a channel list in a station according to a direct sequence scheme, and channels utilized in a hopping pattern according to a frequency hopping scheme. However, the present invention is not limited to thereto. A message to be exchanged in the ATIM window is transmitted via the main channel, which is a specific channel selected through channel scanning. In the data transmission section, data are exchanged via the primary and extra channels.

In FIG. 4A, first and third stations have data to be sent to second and fourth stations, respectively. The first station sends an ATIM (ATIM1) via the main channel to inform the other stations that it has data to be sent. In FIG. 4A, since the first station has transmitted its ATIM1 first, the first station wins the competition with the third station. Therefore, the second station that will receive data transmits an acknowledgement (ACK1) to the first station. Then, when the ATIM window terminates, the first station transmits the data to the second station. All the messages exchanged between the first and second stations are transmitted via the main channel.

Meanwhile, since the third station has lost the competition with the first station, the third station cannot transmit its data via the main channel that the first station uses to transmit the data, until the third station receives a subsequent beacon. However, if the ATIM window has not yet been terminated, the third station transmits an ATIM (ATIM2) in a wireless manner after the second station sends ACK1 to the first station. ATIM2 contains information regarding other channels to be used except the main channel, and is transmitted via the main channel. At this time, if there are no ATIMs sent by other stations, ATIM2 sent by the second station is forwarded to the fourth station, and the fourth station sends an acknowledgement (ACK2) to the third station in response thereto. If the third station receives ACK2 from the fourth station before the ATIM window terminates, the third and fourth stations perform channel switching to a channel indicated by ATIM2 and transmit the data when the ATIM window terminates. The third and fourth stations perform channel switching to the main channel when it is time to receive a subsequent beacon, and repeat the aforementioned process. That is, if the third station has data to be sent to the fourth station, it again sends an ATIM competitively. If the third station wins a competition, it transmits data via the main channel, whereas if the third station loses the competition, it transmits the data via another channel. Then, when it is time to receive a subsequent beacon, the third station again switches the current channel to the main channel.

Meanwhile, if the fifth station with no data to be sent does not receive an ATIM from any stations that intend to send data to the fifth station, it enters a doze mode so as to save power when the ATIM window terminates, and returns to an active mode when it is time to receive a subsequent beacon.

In FIG. 4B, the first and third stations competitively send their ATIMs (ATM1 and ATM2) via the main channel to inform the other stations that they have data to be sent. In FIG. 4B, since the first station receives an acknowledgement (ACK1) from the second station before the third station receives an acknowledgement (ACK2) from the fourth station, the first station wins the competition with the third station. Then, when the ATIM window terminates, the first station transmits the data to the second station via the main channel.

Meanwhile, since the third station has lost the competition with the first station, the third station cannot transmit its data via the main channel that the first station uses to transmit the data, until the third station receives a subsequent beacon. However, if the ATIM window has not yet been terminated, the third station transmits another ATIM (ATIM3) in a wireless manner after the second station sends ACK1 to the first station. ATIM3 contains information regarding other channels to be used except the main channel, and is transmitted via the main channel. At this time, if there are no ATIMs sent by other stations, ATIM2 sent by the second station is forwarded to the fourth station, and the fourth station sends an acknowledgement (ACK3) to the third station in response thereto. If the third station receives ACK3 from the fourth station before the ATIM window terminates, the third and fourth stations perform channel switching to a channel indicated by ATIM2 and transmit the data when the ATIM window terminates. The third and fourth stations perform channel switching to the main channel when it is time to receive a subsequent beacon, and repeat the aforementioned process. That is, if the third station has data to be sent to the fourth station, it again sends an ATIM competitively. If the third station wins a competition, it transmits data via the main channel, whereas if the third station loses the competition, it transmits the data via another channel. Then, when it is time to receive a subsequent beacon, the third station again switches the current channel to the main channel.

Figure 5:
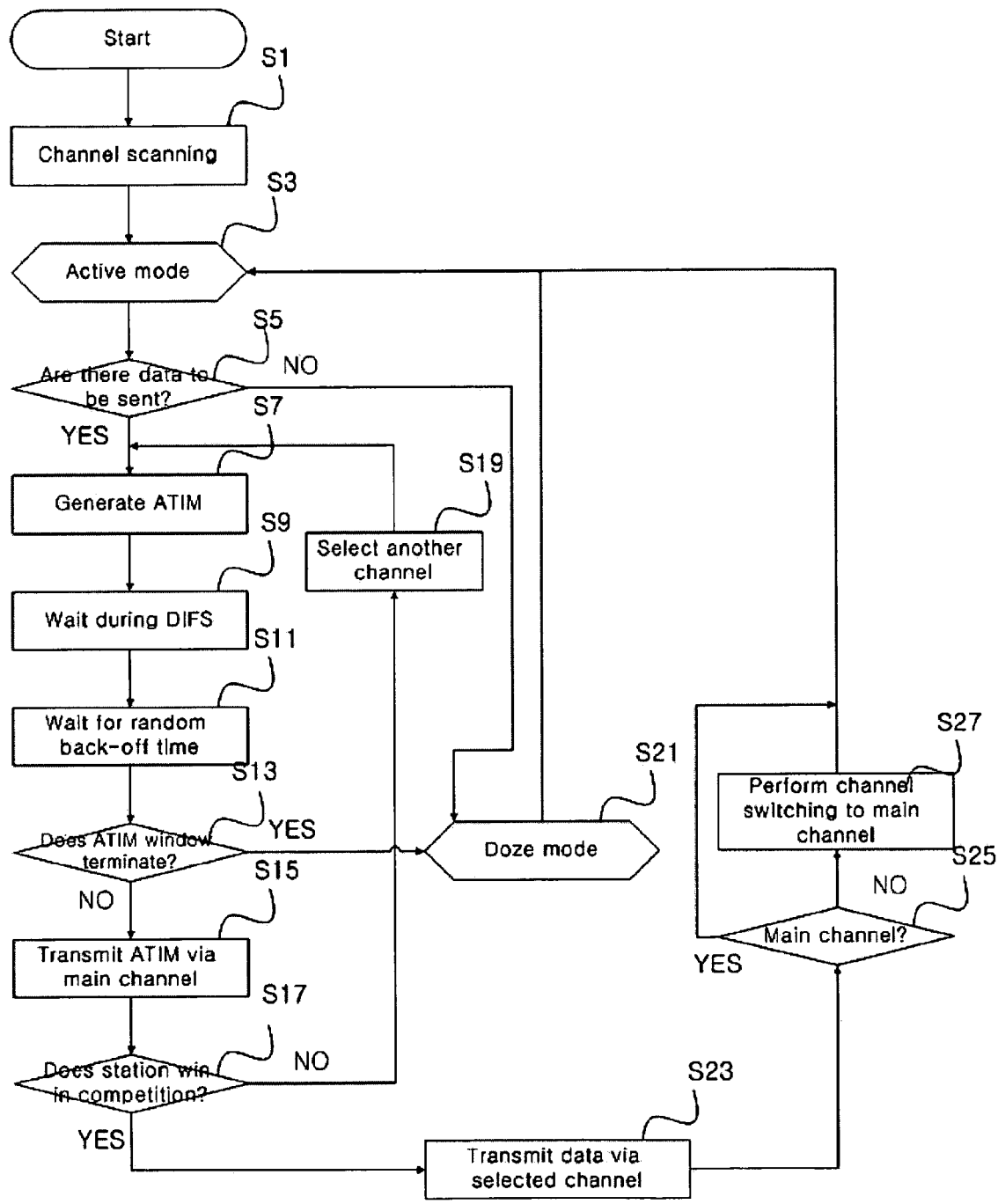
FIG. 5 shows a data transmission process in an ad hoc network according to an exemplary embodiment of the present invention.

FIG. 5 shows a data transmission process in an ad hoc network according to an exemplary embodiment of the present invention.

First, channel scanning is performed to participate in the network (S1). Scanning may be roughly divided into passive scanning and active scanning. The passive scanning waits for a beacon while scanning respective channels in a channel list without sending a frame for scanning. The received beacon is buffered to extract information on a BSS. On the other hand, active scanning directly finds the network by using a probe request frame in order to obtain a response from a network with a specific name. According to an exemplary embodiment the present invention, any one of a plurality of channels identified when stations initially construct a BSS is adopted as a main channel, and a channel that is not used in another BSS is adopted as an extra channel. The beacon or ATIM is transmitted and received via the main channel.

A station that participates in the network after scanning of channels is in active mode (S3). If the station has data to be sent in active mode (S5), it generates an ATIM (S7). The structure of an ATIM frame will be described later with reference to FIG. 7. After generation of the ATIM, the station waits during a distributed interframe space (DIFS) (S9). When the DIFS elapses, the station can transmit the ATIM until the ATIM window terminates. At this time, the station waits during a random back-off time in order to prevent collisions that may be caused as several stations simultaneously send respective ATIMs immediately after the DIFS elapses (S11). Then, the station transmits an ATIM via the main channel (S15). If the station wins a competition (S17), it transmits data via the main channel (S23). Winning a competition corresponds to a case where a station sends an ATIM via the main channel and receives an ACK from a station that is a data transmission target, earlier than the ACKs of other stations. On the other hand, losing a competition corresponds to a case where before a station sends its ATIM to reserve a channel through which data will be transmitted, the station receives an ATIM for reserving the relevant channel from any of the other stations, or before a station receives an ACK from the other station that will be a data transmission target, the station receives an ACK of another station that intends to receive data via the relevant channel.

Meanwhile, if the station loses the competition (S17), it selects a channel other than the main channel (S19), generates an ATIM containing information on the selected channel (S7) and again transmits the generated ATIM via the main channel (S15). If the station wins in competition (S17), it transmits data via the selected channel (S23) and the selected channel is switched to the main channel when it is the time to receive a subsequent beacon (S27). However, if the station loses the competition (S17), it again selects another channel (S19) and generates and transmits an ATIM (S7, S15). If the station wins the competition, it again transmits data via the selected channel (S23). However, if the ATIM window terminates during this process, the station cannot transmit data via the other channel until receiving a new beacon, and accordingly enters the doze mode to save power (S21). Then, if the station receives a new beacon thereafter, it again enters the active mode and repeats the aforementioned process. Although the case has been described where the station receives the beacon, the present invention is not limited thereto and includes a case where the station transmits a beacon.

Figure 6:
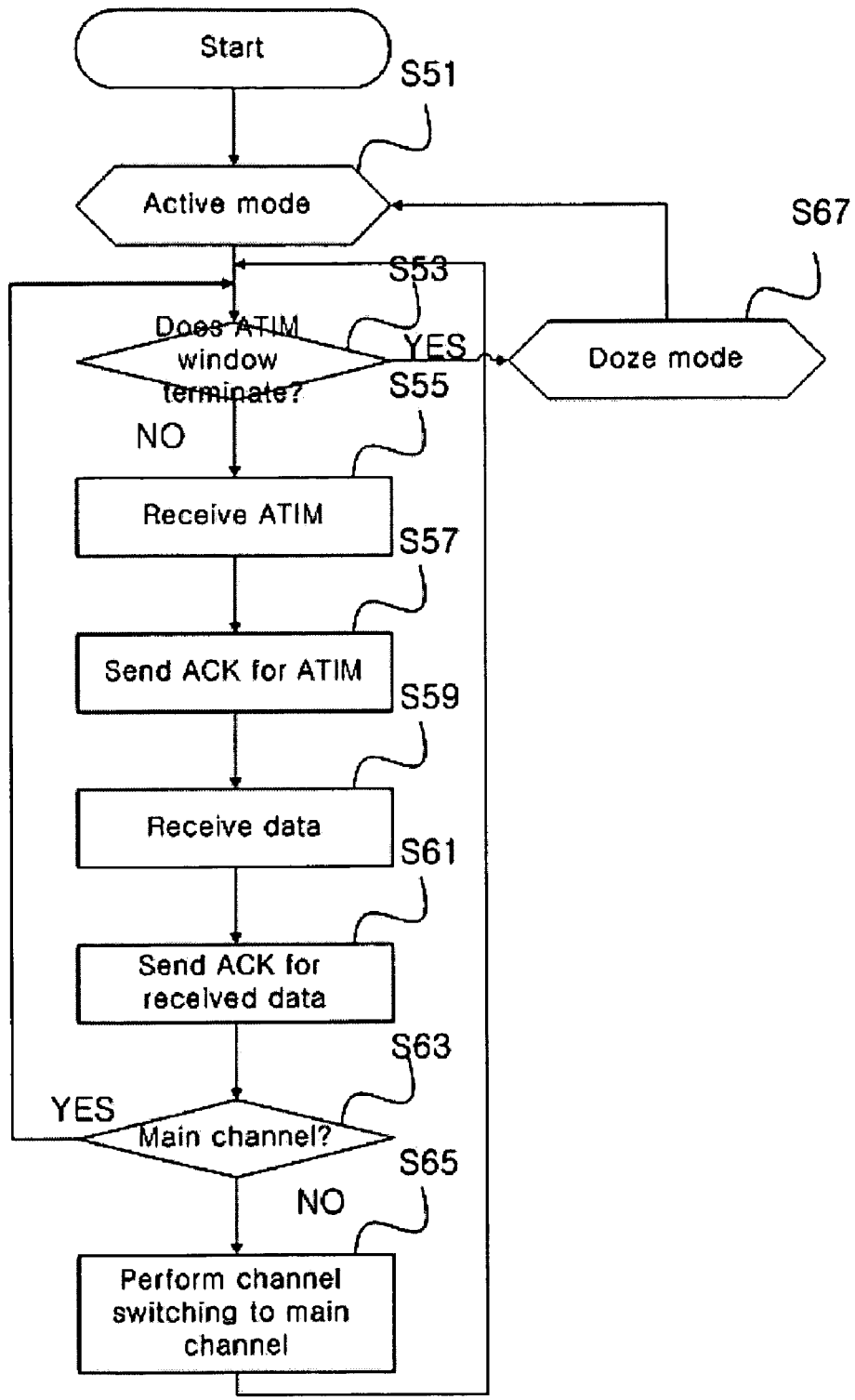
FIG. 6 shows a data reception process in an ad hoc network according to an exemplary embodiment of the present invention.

FIG. 6 shows a data reception process in an ad hoc network according to an exemplary embodiment of the present invention.

A station in the network is initially in the active mode during the time of reception of a beacon (S51). If a station receives a beacon but does not receive an ATIM during the ATIM window (S53), the station enters the doze mode (S67) and then returns to the active mode during the time for the reception of a new beacon (S51). If the station receives an ATIM (S55) before the ATIM window terminates (S53), it sends an ACK to a station that has transmitted the ATIM (S57) and then receives data (S59). At this time, the station receives the data via a relevant channel according to channel information contained in the received ATIM frame (S59) and sends the ACK in response to the reception of the data via the relevant channel (S61). If the relevant channel is the main channel (S63), the station does not have to perform channel switching. However, if the relevant channel is not the main channel (S63), the station switches the current channel to the main channel at the time of reception of a subsequent beacon (S65).

Figure 7:
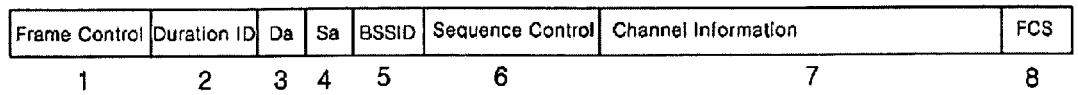
FIG. 7 shows the structure of an ATIM frame according to an exemplary embodiment of the present invention.

FIG. 7 shows the structure of an ATIM frame according to an exemplary embodiment of the present invention.

The ATIM frame includes frame control 1, a duration ID 2, a receiving station address 3, a transmitting station address 4, a basic service set ID 5, sequence control 6, channel information 7, and frame check sequence 8.

The frame control 1 is composed of 2 bytes. Specifically, the first 2 bits represents a protocol version. The subsequent 2 bits and the following 4 bits thereafter represent the type of frame and a subtype, respectively, and have values of 00 and 1001, respectively, since the ATIM frame is of a management type and ATIM subtype. In addition to these bits, the frame control has one bit of ToDS, one bit of FromDS, one bit of an additional fragment, one bit of retry, one bit of power management, one bit of additional data, one bit of wired equivalent privacy (WEP), and one bit of order.

The duration ID 2 can be used for setting a network allocation vector (NAV), for a frame transmitted during a non-competing period, and for a power-saving check frame.

The receiving station address 3 is a 48-bit IEEE MAC identifier corresponding to a station performing forwarding to an upper protocol layer for operation of a frame in the same manner as the Ethernet, and the transmitting station address 4 is a 48-bit IEEE MAC identifier of a transmitting station. The basic server set ID (BSSID) 5 is used for discriminating wireless LANs existing in the same area. The ad hoc network generates any BSSID by setting a universal/local bit as "1" in order to avoid collisions with a formally specified MAC address.

The sequence control 6 is a field used for fragmentation/re-assembly and removal of overlapping frames. The sequence control 6 is composed of a 4-bit fragmentation number field and a 12-bit sequence number field.

The channel information 7 is a portion corresponding to a data field of IEEE 802.11 and can store data up to 2,304 bytes. The channel information 7 includes information regarding the main channel and an extra channel. The channel information also contains information regarding a channel through which data should be transmitted or received.

Finally, the frame check sequence (FCS) 8 a field used for checking the integrity of a received frame. The frame check sequence is often called a cyclic redundancy check (CRC). Upon wireless transmission of a frame, the FCS is calculated before the frame is transmitted by means of a radio frequency or infrared rays. Meanwhile, a receiving station calculates the FCS from a received frame and compares the calculated FCS with a received FCS. If they match, the receiving station determines that the frame does not have abnormalities during the transmission process. If there are no abnormalities, the receiving station sends an ACK to a relevant transmitting station. In IEEE 802.11, if there are any abnormalities, the receiving station does not transmit a message while the transmitting station resends a frame when it does not receive an ACK after a predetermined period of time.

Figure 8:
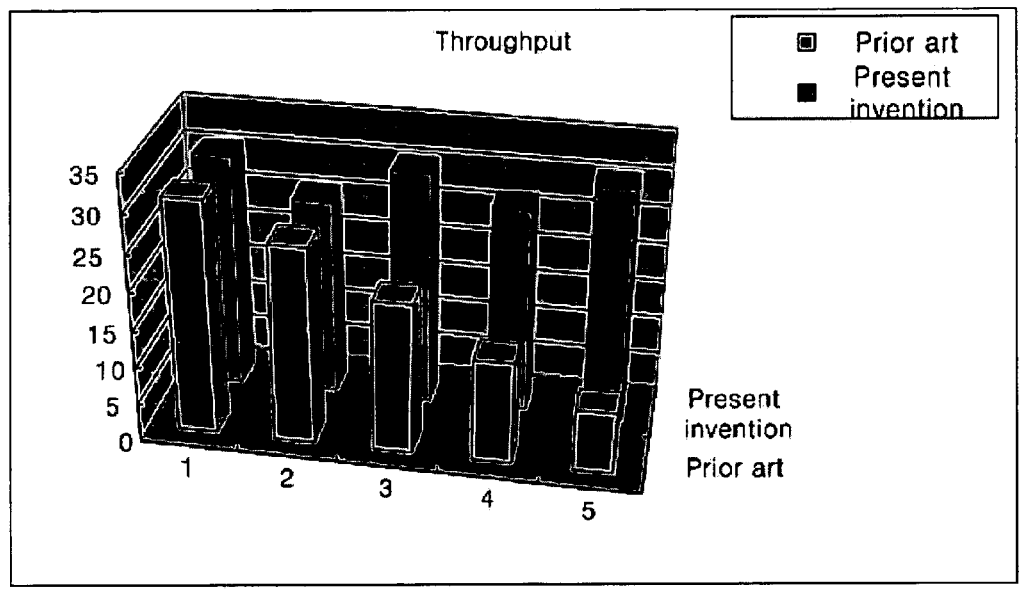
FIG. 8 is a graph showing data throughput for an exemplary embodiment the present invention.

FIG. 8 is a graph showing data throughput for an exemplary embodiment of the present invention.

It is assumed that three channels are available and a channel includes two stations. Further, it is assumed that a total of five stations exist and that a packet has a size of 1,500 bytes.

The space between beacons ranged from about 10 msec to 100 msec and the size of the ATIM window was 20% of the beacon space.

As can be seen from FIG. 8, according to an exemplary embodiment of the present invention, even though the number of stations increases, the amount of data that one station can transmit, i.e. throughput, remains constant to a certain degree.

According to the present invention as described above, compatibility with an existing method can be improved since a frame with the same structure as an existing MAC frame can be utilized by storing channel information in a data field. Further, due to implementation according to existing MAC control procedures, reliable data transmission capability, which is a basic purpose of the MAC, is maintained, and compatibility with an existing BSS is provided since a BSS can be constructed to meet existing standards. That is, when a BBS is constructed according to the present invention, an existing method can be utilized even though a station does not support multiple channels.

Furthermore, according to the present invention, there is an advantage in that in a case where frequent collisions occur due to a large number of stations, the amount of data to be transmitted increases as the number of channels increases. Therefore, the present invention has an advantage in that the number of stations capable of physically participating in a network increases in practice.

It will be understood by those skilled in the art that the present invention can be implemented in other specific forms without changing the technical spirit or essential features of the present invention. Although the competition has been described in connection with the DCF standards in the above, the present invention is not limited thereto and may include any future variable standards. Therefore, it should be noted that the forgoing embodiments are merely illustrative and are not to be construed as limiting the present invention. The scope of the present invention is defined by the appended claimed rather than the detailed description of the present invention. All changes or modifications or their equivalents made within the meanings and scope of the claims should be construed as falling within the scope of the present invention.

What is claimed is:

1. A method for wireless local area network (LAN) transmission using multiple channels, the method comprising:

generating, by a second station intending to transmit data to a first station, a first announcement traffic indication message (ATIM) containing channel information regarding a first channel through which data will be transmitted, and transmitting the first ATIM via the first channel during an ATIM transmission window;

if the second station loses a channel reservation competition regarding the first channel, generating, by the second station, a second ATIM containing channel information regarding a second channel different than the first channel, and transmitting the second ATIM via the first channel before the ATIM transmission window terminates; and if the second station receives an acknowledgement (ACK) from the first station in response to the second ATIM before the ATIM transmission window terminates, performing, by the second station, channel switching from the first channel to the second channel and transmitting data via the second channel after the ATIM transmission window terminates.

2. The method as claimed in claim 1, wherein a determination whether the second station loses the channel reservation competition is made based on whether the second station receives an ACK from the first station in response to the first ATIM before receiving an ACK from another station that intends to receive data via the first channel.

3. The method as claimed in claim 1, wherein a frame structure of the first and second ATIMs generated by the second station complies with IEEE 802.11 standards, and the channel information is stored in a data field of the first and second ATIMs.

4. The method as claimed in claim 1, further comprising the step of:
switching, by the second station, back to the first channel at a time for reception of a beacon.

5. The method as claimed in claim 1, wherein the second station generates and transmits the first and second ATIMs within an ATIM window.

6. The method as claimed in claim 1, wherein the second station generates the first ATIM, and then transmits the first ATIM after a predetermined period of time.

7. The method as claimed in claim 1, further comprising, if the second station wins the channel reservation competition regarding the first channel, transmitting, by the second station, data via the first channel.

8. The method as claimed in claim 7, wherein a determination whether the second station wins the channel reservation competition is made based on whether the second station receives an ACK from the first station in response to the first ATIM before receiving an ACK from another station that intends to receive data via the first channel.

9. A method for wireless local area network (LAN) reception using multiple channels, the method comprising:
receiving, by a first station, a first announcement traffic indication message (ATIM) containing channel information regarding a first channel through which a second station will transmit data, via a first channel during an ATIM transmission window;
sending, by the first station, a first acknowledgement (ACK) for the first ATIM to the second station via the first channel during the ATIM transmission window;
if the second station loses a channel reservation competition regarding the first channel receiving, by the first station, a second ATIM containing channel information regarding a second channel through which the second station will transmit data, via the first channel during the ATIM transmission window;
sending, by the first station, a second acknowledgement (ACK) for the second ATIM to the second station via the first channel during the ATIM transmission window;
switching, by the first station, from the first channel to the second channel, and receiving the data from the second station via the second channel after the ATIM transmission window terminates; and
sending, by the first station, a third ACK in response to receiving the data to the second station via the second channel.

10. The method as claimed in claim 9, wherein the first station acquires the channel information regarding the second channel from a data field of the received ATIM.

11. The method as claimed in claim 9, further comprising the step of:
switching, by the first station, to the first channel at a time for reception of a beacon.

12. The method as claimed in claim 9, wherein the first station transmits the first ACK to the second station only when the first station receives the ATIM within an ATIM window.

13. A method for wireless local area network (LAN) transmission using multiple channels, the method comprising:
generating, by a second station intending to transmit data to a first station, a first announcement traffic indication message (ATIM) containing channel information regarding a first channel through which data will be transmitted by the second station;
if the second station does not receive from a third station a second ATIM containing channel information regarding the first channel through which data will be transmitted by the third station, transmitting the first ATIM from the second station to the first station via a first channel;
if the second station does not receive the second ATIM, generating, by the second station, a third ATIM containing channel information regarding a second channel through which data will be transmitted by the second station, and transmitting the third ATIM via the first channel; and
if the second station receives an acknowledgement from the first station in response to the third ATIM before receiving an acknowledgement from the first station in response to the first ATIM, performing, by the second station, channel switching from the first channel to the second channel and transmitting data via the second channel.

* * * * *